March 20, 1951

C. W. BERTHIEZ 2,545,837

MANUALLY OPERATED CONTROL SWITCH
FOR MACHINE TOOLS OR THE LIKE

Filed Feb. 28, 1946

INVENTOR
Charles William Berthiez

By George H. Corey
ATTORNEY

March 20, 1951  C. W. BERTHIEZ  2,545,837
MANUALLY OPERATED CONTROL SWITCH
FOR MACHINE TOOLS OR THE LIKE
Filed Feb. 28, 1946  2 Sheets-Sheet 2
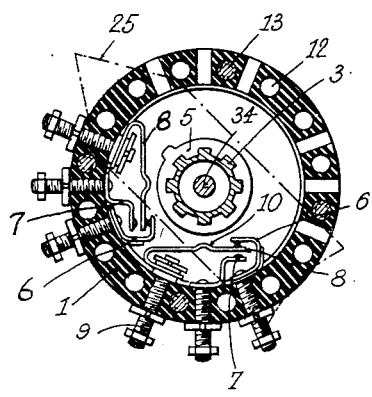
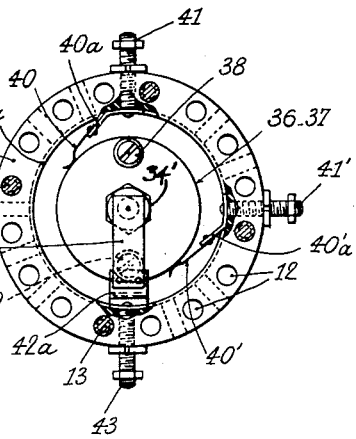
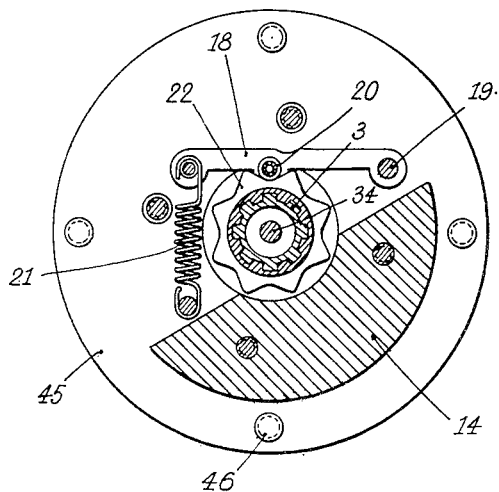
INVENTOR
Charles William Berthiez
By George H. Corey
ATTORNEY Patented Mar. 20, 1951

2,545,837

UNITED STATES PATENT OFFICE 2,545,837

MANUALLY OPERATED CONTROL SWITCH FOR MACHINE TOOLS OR THE LIKE

Charles William Berthiez, Paris, France

Application February 28, 1946, Serial No. 651,022
In France March 20, 1945

13 Claims. (Cl. 200—5)

This invention relates to electrical control apparatus for selective control of the operations of an electrically driven machine, such as a machine tool or the like. The invention particularly relates to apparatus for controlling the movement of members of a machine tool, for example, the carriage or similar member of a planer or milling machine which are adapted to move in respective paths of movement which extend in different directions with respect to each other. The invention also relates to the control of members which are adapted for rotation thereof, such as the spindle of a milling machine or a boring mill.

For the control of such movements of machine tool members when electrically driven ordinarily a plurality of levers, switches, push buttons and similar elements heretofore have been utilized to connect in the electrical circuit the driving motor for the movable member of the machine tool which is selected to be operated. Especially in connection with modern machine tools in which a substantial number of movable members are utilized each of which must move to and fro in its path of movement and each of which must be started and stopped, the control devices become numerous and complicated in relation to each other. Particularly in large machine tools occupying a substantial floor space and requiring that the driving motors be positioned some distance from the point at which the cutting operation on the work piece is effected, if the controls are located near the motors, adjusting the member to be moved requires that the operator move about the machine and away from the position where it is convenient to observe the relation of the cutting tool to the work piece and the operation thereof on the work piece. Although with electric drive such controls may be grouped adjacent the position which the machine operator preferably takes, the mere grouping itself of the controls requires of the operator close attention for accurate selection of the proper control from among a large number of actuatable elements in order that damage to the work piece or to the machine may not result from improper selection of the operation or of the machine tool member to be operated.

It is an object of the invention to provide an improved electrical control device for selection of any of a plurality of circuits to be controlled and for controlling the selected circuit.

It is another object of the invention to provide an electrical control device which is adapted for controlling the operation of motor driven machine tool members which is of simple form and easily actuated by the machine operator for selection of the desired condition of movement.

It is an additional object of the invention to provide a control device of this character in which only a small number of parts such as switches, push buttons and the like are utilized to accomplish selection and control of the circuits and the desired movements of the machine tool members.

It is a further object of the invention to provide a control device of such construction that a large number of selections conveniently may be made and the requisite to and fro movement of the selected member and the starting and stopping thereof or the establishment of other control conditions may be easily accomplished.

It is a feature of the invention that a selector element is utilized which is operable to a plurality of different positions for selecting the circuit for control of the electrical driving means for moving the machine tool member which it is desired to move or to operate. In the preferred form this selector element is arranged for rotation thereof on an axis of rotation to different selecting positions. In each of these positions the construction of the control device of the invention provides for connecting it in a circuit with the means for energizing the driving means, such as a motor, which is operatively connected to the member of the machine tool which it is desired to operate. The construction of the device is such that elementary units of similar form may be assembled in the device, each elementary unit providing contacts connectible in circuit with the control means for energizing the motor, these elementary units being adapted to be positioned in different positions in the device corresponding to the different selecting positions of the selecting element.

In accordance with a further feature of the invention the starting and stopping of the selected member is effected respectively by means of starting and stopping elements, such as push buttons which are carried by the selector element itself. The device of the invention provides a construction in which for each selected position of the selector element the start and stop elements are effective to cooperate with the control means so that the motor for driving the selected machine tool member is energized only upon pushing the starting element or push button and is stopped upon pushing the stopping element or push button. The construction is such, however, that these push buttons may be utilized to establish and disestablish circuits for other purposes, such as determining the amount of movement in a selected direction or the locking and unlocking of a movable member.

In the preferred embodiment of the invention the selector element is rotatable on the axis of one or more coaxial annular members of insulating material for support of the contacts connected in circuit to the control means for effecting energization of the motor corresponding to the selected positions of the selector element. In this preferred embodiment a plurality of the annular contact supporting members or blocks are assembled in a unitary whole together with the means, such as a block of suitable form, to cooperate with these annular members to support brushes which respectively bear on collector rings which also are carried by the selector element for rotation therewith and which serve to connect the circuit to be controlled by the push buttons which is exterior to the device to the wires and push button contacts which are part of the device of the invention as above described, these push buttons being carried by the selector element.

These and other features of the invention will be more clearly understood from the following description of the drawings, in which Fig. 1 is a longitudinal elevation of the device of the invention;

Fig. 3 is a cross section taken on the line III—III of Fig. 2;

Fig. 4 is an elevation taken on the line IV—IV of Fig. 2 with the end closure of the device removed; and Fig. 5 is a section taken on the line V—V of Fig. 2.

Figure 1:
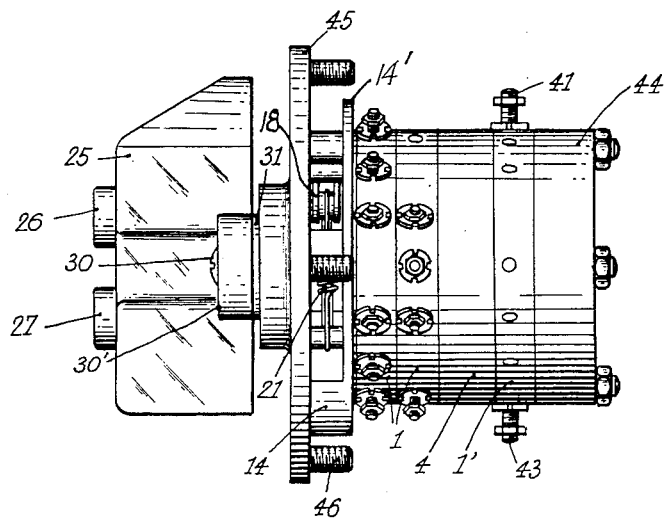
Figure 2:
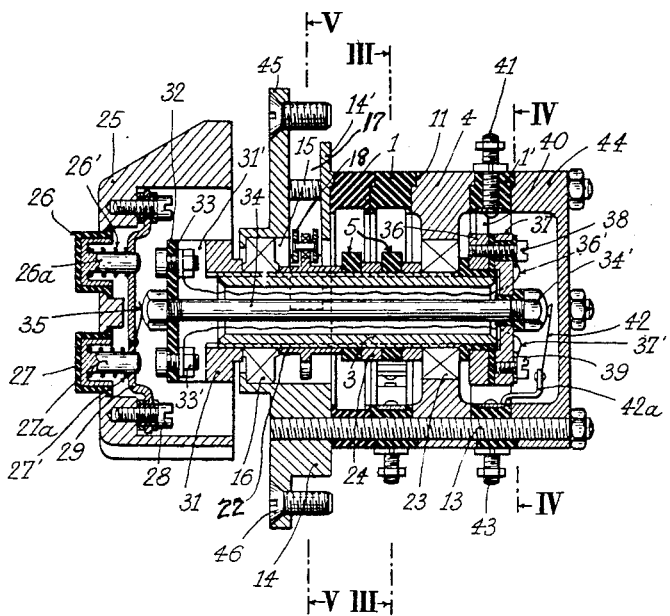
Fig. 2 is a longitudinal cross section taken on the axis of rotation of the selector element.

As will be seen in the drawing, the control device of the invention comprises a number of annular contact supporting members or blocks 1 stacked up one against the other and pressed together by means of bolts 13 between the supporting plate 14 carrying the frontal bearing 16 of the hollow shaft 3 of the control device on one hand, and the support 4 for the rear bearing 23 of this shaft, on the other hand, this shaft carrying the cams 5 actuating the contact elements 8 as shown in Figs. 2 and 3.

Each annular contact supporting block 1 is made of an insulating material and is adapted to support a certain number of contact units, for example four units, arranged at 90° in respect of each other. Each unit comprises two stationary contact elements 6 and 7 and one movable contact element 8. Only two contact units are shown in place in the annular block 1 of Fig. 3.

The contact elements 6, 7 and 8 are fastened to the insulating annular member 1 by means of radially extending bolts 9 which also act as connecting terminals.

The movable contact element 8 may be of spring material so as normally to bear upon one of the stationary contact elements, that is, contact element 6 in Fig. 3, and is formed with a bent part 10 adapted to be engaged by the corresponding cam 5.

The two side faces of the annular blocks 1 are provided with interfitting shoulders 11, Fig. 2, so as to permit of stacking and centering the blocks for axial alignment with each other. The rear bearing support 4 for the shaft 3 is provided with shoulders in the same manner so that it also may fit to the stacked up blocks 1.

The insulating block 1 is, moreover, provided with a series of uniformly spaced holes 12 for the passage of the rods or bolts 13. These holes are distributed in such manner that the blocks may be staggered in respect of each other about the shaft 3 over a fraction of the circumference (⅛ of the circumference in the example illustrated).

The assembly of the blocks 1, the bearing support 4 and other elements of the control device, as will be referred to hereafter, is carried by the supporting plate 14, which may for example be circular, providing a housing for the centering bearing 16 of the shaft 3 and an open space 17 running perpendicularly to the axis in which is placed the device for insuring and maintaining the position of the selector which will be described below. This open space is flanked at the rear side by plate 14' integral with plate 14 and cooperating therewith to receive the bearing thereagainst of the adjacent block 1.

In order to hold the shaft 3 which carries the cams 5 for the establishment of the circuits by closing contacts 6 and 8 in its desired position, a holding or position insuring device is provided as shown in Fig. 5. This device comprises a lever 18 mounted for oscillating movement about a stud 19 and carrying a small roll 20 mounted on ball bearings and acting as a follower. The lever 18 is constantly urged downward in Fig. 5 by a spring 21 towards the shaft 3 so as to urge the follower 20 to the bottom of one or another of the spaces between the teeth in the star wheel 22, the number of spaces being equal to the number of positions which the control device will occupy per revolution. This star wheel is keyed to the hollow shaft 3 which, for this purpose, is formed with corresponding grooves, Figs. 3 and 5, acting at the same time as keys for cams 5.

This arrangement insures the immobilization of the cam shaft in its various positions and positive passage from one position to another.

The rear bearing support 4 comprises a metallic plate carrying the centering bearing 23 for carrying the shaft 3. This support 4 is formed with shoulders as centering means analogous to those of the contact supporting blocks 1 to allow its being stacked up and its centering on the axis of the blocks 1.

The cam shaft 3, as above stated, is grooved lengthwise thereof on its exterior surface. On this shaft are stacked up the operating cams 5 separated by suitable spacers 24. The star wheel 22 is placed in front of the first cam. These cams and spacers are held on the shaft in position between the star wheel 22 and the rear bearing 23 and the contact supporting blocks 1 are held between the supporting plate 14, 14' and the bearing support 4 by threaded rods 13 as shown in Fig. 2.

It results from the foregoing that, in accordance with the number and nature of the contacts of each block 1, the number and arrangement of the blocks and, finally, the number of positions and the shape of the cams, it is possible to obtain all the combinations required for a wiring system for the control of any movable element of a machine such as, for example, a machine tool.

The actuating element of the control device in which resides one of the features of the invention, comprises a selector element 25 which may be of hollow form and adapted to carry two push buttons 26 and 27. The body 25 of the actuating element is preferably arrow shaped as indicated in Fig. 3. It may be made of a light alloy, moulded or otherwise formed or of a plastic material or the like. The two push buttons 26 and 27 are made of any suitable material such as moulded plastic and comprise studs 26a or 27a of conducting material formed with heads imbedded in the buttons while being moulded. These buttons slidably protrude through the wall of the arrow shaped body 25 and are provided with shoulders held against the inner face of the wall of the selector element 25 by helical compression springs 26' and 27'. The springs are coaxial respectively with the studs 26a, 27a and engage these studs in annular recesses formed at the inner side of the heads of said studs.

Inside the body 25 is fastened by any suitable means, such as screws 28, a properly shaped small plate 29 of conducting material which serves in guiding the inner ends of the studs 26a, 27a of the buttons and in supporting the reaction of the springs 26', 27' of these buttons.

A hub 31 having inner grooves fitted to the externally grooved shaft 3 and being made of any suitable material, such as steel, is fastened by means of screws 30 to a circular shoulder of the body 25, this hub 31 thus being adapted to insure the drive of the shaft 3 upon actuating the selector element 25. To this hub 31 within the hollow body 25 is connected a bridge 32, made of insulating material and supporting the terminals or contacts 33 as shown in Fig. 2. These terminals 33 are held in place by nuts 33' which serve also to fasten the connecting leads 36', 37'.

A bolt 34 passing through the hollow shaft 3 ensures tightening up of all parts mounted on this shaft and holds the bridge 32 in place. This bolt also acts as a common return lead for the circuits controlled by the push buttons. For this purpose a flexible spring blade 35 is fastened upon the conducting plate 29 and bears on the head of bolt 34, thus insuring continuous electrical contact between bolt 34 and plate 29 as the shaft 3 is rotated. The flow of the current from plate 29 to the studs 26a and 27a of the buttons is then effectuated through the springs 26', 27' of these buttons in contact with the heads of the studs.

The controlled closure of the operating circuits (for example starting and stopping respectively) is attained by selectively bringing in contact the studs 26a and 27a of the buttons with the ends of the terminals 33, the buttons being pushed against the bias of the respective springs 26', 27'.

The two wires 36', 37' connected respectively to these terminals or contacts 33 pass through the annular space between the bolt 34 and the bore of the hollow shaft 3 in insulated relation thereto and extend to the rear part of the control device where they are connected to the lead in device.

This lead in device is formed by a frictional contact device arranged in the following manner:

At the end of the shaft 3 are mounted two collector rings 36 and 37 insulated from each other and from shaft 3 which are held in place by the bolt 34. Two screws 38 and 39 respectively tapped into collector rings 36, 37 serve as terminals for the two wires 36', 37' extending from the contacts 33 of the push button switches to connect these wires to the respective collector rings.

A small metallic blade or brush 40, as shown in Fig. 4, is held in place by and electrically connected to a terminal 41 identical with the terminal bolts 9 utilized for the block contacts 6, 7, 8. This brush 40 rubs against the ring 36 while a similar brush 40' similarly held by and connected to terminal 41' rubs upon collector ring 37.

As shown in Figs. 2 and 4, a spring blade 42 continuously bearing upon the nut 34' of the bolt 34, also is held by and connected to a terminal 43 identical to those referred to above.

The terminals 41, 41' and 43 are fastened to an insulating annular contact supporting block 1' identical with the blocks 1 in the same manner as are the terminals 9. The block 1' is stacked together with the other elements already described and pressed against the rear bearing support 4 by tightening the bolts 13. To the terminals 41, 41' and 43 are fastened the brush supporting elements 40a, 40'a and 42a to which the brushes 40, 40' and 42 are fastened. The supporting elements 40a, 40'a and 42a fit in the internal groove 1'a as do similar parts of contacts 6, 7 and 8 to hold these elements against turning on the terminal bolts 41, 41' and 43 from the contacting position. A rear supporting shield or cap 44 also held in place by bolts 13 closes the rear part of the device and cooperates with the annular blocks 1, 1' and bearing supports 4 and 14 to protect the operating parts of the device.

The whole of the control device thus presents a closed, perfectly protected unit in which aside from the selector element and its push buttons only the terminals are accessible.

The supporting plate 14 is provided with a flange 45 whereby the control device may be readily fastened to a machine frame, a panel or the like, by suitable means such as screws 46.

A plate engraved with the proper indications corresponding to the various positions of the selector element 25 may be supported by suitable means in the free space left between the flange 45 and the selector element 25.

As appears from the foregoing description, the combined control device of the invention permits of grouping in a restricted space all the elements required for the respective selective conditioning and control of circuits for operating a movable element of a machine and, notwithstanding its small volume, of establishing a large number of diversified circuits.

Furthermore, all parts concerning one and the same machine element for a predetermined series of operations being incorporated in the one device, the dispersion of movements to be performed by the operator is prevented, thereby realizing a saving of time in the execution of the various manipulations.

The control device constituting a compact unit which is also fully protected, may be easily handled and put in place, dismounted, repaired and kept in good order.

It is to be understood that the control device as described hereinabove and illustrated in the accompanying drawing is to be considered as being given by way of example, and that its constructional details may be varied without departing from the scope of the invention. Thus, more particularly, the number of the contact groups and the number of the contact blocks 1 may be different from those shown to suit particular conditions. Furthermore, suitable insulation will be provided where necessary for the metallic parts and conductive elements. Instead of being positioned behind the rear bearing support 4, the block 1' may be arranged between the other contact blocks 1 and the support 4. Other modifications may be made which are intended to be within the scope of the following claims.

What is claimed is:

1. An electrical control device which comprises a selector member, means for supporting said selector member for rotation thereof on an axis to a plurality of circuit selecting positions, an annular contact carrying member, means cooperating with said selector member supporting means for supporting said annular contact carrying member with the annulus thereof extending about said axis of said selector member and selectively in different positions angularly displaced about said axis of said selector member, an electric contact carried peripherally on said annular member and actuable to control an electric circuit, and means operatively connected to said selector member and operatively connectible with said electric contact to actuate said contact upon rotation of said selector member to a selected position.

2. An electrical control device which comprises a selector member, means for supporting said selector member for rotation thereof on an axis to a plurality of circuit selecting positions, a plurality of annular contact carrying members, means cooperating with said selector member supporting means for supporting each of said annular contact carrying members with the annulus thereof extending about said axis of said selector member and selectively in different predetermined positions angularly displaced about said axis, the respective annular members being disposed in different predetermined positions angularly displaced about said axis relative to each other, a plurality of electric contacts actuatable to control respective electric circuits and carried respectively peripherally on said annular members in spaced relation about the axis of rotation of said selector member in positions corresponding to said predetermined positions of the respective annular members, and means operatively connected to said selector member and operatively connectible with the respective electric contacts when said selector member is respectively in said circuit selecting positions to actuate the selected contact.

3. An electrical control device which comprises an annular contact carrying member, an electric contact carried on said annular member and actuatable to control an electric circuit, a terminal electrically connected to said contact, said annular member having a plurality of holes extending therethrough parallel to the axis of the annulus and equally spaced circumferentially about said axis, a bearing support formed to fit against a face of said annular member which is transverse to said axis thereof, said bearing support having a hole therethrough registerable selectively with said holes in said annular member, a bolt extending through registering holes of said annular member and said bearing support to hold said annular member in a predetermined relation to said bearing support, a rotatable selector member supported in bearing relation to said bearing support for rotation of said selector member on the axis of said annulus, and means carried by said rotatable selector member and operatively engaging said electric contact to actuate said contact upon rotation of said selector member to a predetermined position relative to said bearing support.

4. An electrical control device as defined in claim 3 which comprises a plurality of said annular contact carrying members each carrying at least one of said electric contacts and the terminal connected thereto, at least one of said annular members being positioned with respect to another of said annular members with the electric contacts carried by said two annular members in angularly spaced relation about said axis as determined by the spacing of the holes in said annular members, said bolt passing through said annular members for holding said annular members in predetermined relation to each other and to said bearing support.

5. An electrical control device as defined in claim 3 which comprises an auxiliary annular member formed to bear against a face transverse to said axis of the assembly of said annular member and said bearing support and having a hole therethrough parallel with said axis and registerable with said hole in said bearing support, said bolt passing through said hole in said auxiliary member, said auxiliary annular member carrying an auxiliary electrical contact and a terminal electrically connected to said auxiliary contact, a circuit control switch carried by said rotatable selector member, a conducting element carried by and rotatable with said selector member and electrically connected to said circuit control switch, and means providing a continuous electrical connection between said conducting element and said auxiliary electric contact and its terminal in all positions to which said rotatable selector member is rotated to establish an auxiliary circuit upon operation of said control switch in any selected position of said selector member.

6. A control device as defined in claim 3 which comprises an end closing member formed to fit against a face transverse to said axis of the assembly of said annular member and said bearing support, said closing member being provided with a hole which is registerable with said hole in said bearing support and through which hole said bolt passes, said electric contact being carried by said annular member internally of the annulus thereof, said annular member cooperating with said bearing support and with said end closing member to enclose said contacts and said contacts actuating means internally thereof.

7. An electrical control device which comprises a selector member supported to be movable to a plurality of different circuit selecting positions upon operation thereof, circuit closing contacts carried by said electrical control device in said respective positions and adapted to be actuated by said selector member when in said respective positions respectively to control circuits connectible to said contacts, a terminal carried by said electrical control device, a circuit controlling switch carried by said movable selector member and movable therewith to said different selecting positions and operable in each of said selecting positions, and conducting means carried by said selector member connecting said switch to said terminal in all selecting positions of said selector member, whereby said switch upon operation thereof in any of said selecting positions is effective to control an auxiliary circuit connectible to said terminal.

8. An electrical control device which comprises a selector member supported to be rotatable on an axis to a plurality of different circuit selecting positions upon operation thereof, circuit closing contacts carried by said electrical control device in said respective positions and adapted to be actuated by said selector member when in said respective positions respectively to control circuits connectible to said contacts, terminals carried by said electrical control device, a circuit controlling switch carried by said rotatable selector member and rotatable therewith to different selecting positions and operable in each of said selecting positions, conducting means carried by and rotatable with said selector member and connected in circuit with said switch, and means adapted to maintain connection of said conducting means and said switch in circuit therewith to said terminals in all selecting positions of said selector member, whereby said switch upon operation thereof in any of said selecting positions is effective to control an auxiliary circuit connectible to said terminals.

9. An electrical control device which comprises a selector member supported to be rotatable on an axis to a plurality of different circuit selecting positions upon operation thereof, circuit closing contacts carried by said electrical control device in said respective positions and adapted to be actuated by said selector member when in said respective positions respectively to control circuits connectible to said contacts, a plurality of supply terminals supported by said electrical control device, a plurality of circuit controlling switches carried by said rotatable selector member and rotatable therewith to said different circuit selecting positions, each switch having a contact stud and a contact piece and being operable in each selecting position of said selector member to make and break contact of its stud and its contact piece, means providing a continuous electrical connection respectively between said contact pieces of said switches and said supply terminals in all selecting positions of said selector member, a return circuit terminal supported by said electrical control device, and means providing a continuous electrical connection between said contact studs of said switches and said return circuit terminal in all selecting positions of said selector member, whereby said switches upon operation thereof in any of said selecting positions respectively are effective to control auxiliary circuits respectively connected to said supply terminals and connected to said return circuit terminal.

10. An electrical control device which comprises a selector member supported to be rotatable on an axis to a plurality of different circuit selecting positions upon operation thereof, circuit closing contacts carried by said electrical control device in said respective positions and adapted to be actuated by said selector member when in said respective positions respectively to control circuits connectible to said contacts, a plurality of supply terminals supported by said electrical control device, a plurality of circuit controlling switches carried by said rotatable selector member and rotatable therewith to said different circuit selecting positions, each switch having a pair of contacts and being operable in each position of said selector member to close and open said contacts, a plurality of collector rings supported to be rotatable with said selector member concentric with the axis of rotation thereof and respectively electrically connected to given contacts of the respective switches, brushes supported by said control device respectively in continuous contact with said collector rings in all positions of said selector member and respectively connected to said terminals, a common conducting member rotating with said selector member and connected to the other contacts of the respective switches, a return circuit terminal supported by said control device, and a brush supported by said control device for contact with said common conducting member in all said selecting positions of said selector member and connected to said return circuit terminal, whereby said switches upon operation thereof in any of said selecting positions respectively are effective to control auxiliary circuits respectively connected to said supply terminals and connected to said return circuit terminal.

11. An electrical control device which comprises a hollow shaft, means for supporting said shaft for rotation thereof on its axis, a selector member mounted on said shaft for rotation therewith to a plurality of different selecting positions of said selector member, a set of main circuit closing contacts supported by said control device respectively in said selecting positions, cams carried by said shaft and adapted to operate the respective main contacts upon rotation of said shaft and said selector member to the respective selecting positions, main terminals supported by said control device and respectively connected to said main circuit closing contacts, at least two push buttons carried by said selector member, contact studs carried by said shaft and respectively actuated by said push buttons upon operation thereof, a contact associated with each contact stud and carried by said shaft in insulated relation thereto, said contact studs being operable to engage the respective contacts in each of said selecting positions of said selector member, at least two slip rings carried by said hollow shaft and insulated with respect thereto, connecting wires arranged within said hollow shaft respectively connecting said contacts of said push buttons to said slip rings, brushes supported by said control device and respectively adapted to engage said slip rings to provide electrical contact therewith in said different selecting positions of said selector member, auxiliary terminals supported by said control device and respectively connected to said brushes, a conductor rod coaxial with said hollow shaft and insulated with respect thereto, said rod being electrically connected to said contact studs, a return circuit brush supported by said control device and adapted to bear upon said rod in continuous electrical contact therewith during rotation thereof, and a common return circuit terminal supported by said control device and connected to said return circuit brush.

12. An electrical control device as defined in claim 8 which comprises a plurality of annular contact carrying members, means for supporting said contact carrying members coaxially with the axis of rotation of said selector member, said circuit closing contacts being carried by the respective annular members, and means for selectively positioning said annular contact carrying members in different positions angularly displaced about said axis thereof to position the respective circuit closing contacts in different positions angularly displaced from each other about said axis to provide for actuation of the respective circuit closing contacts by said selector member when in said respective circuit selecting positions thereof.

13. An electrical control device as defined in claim 12 in which said annular contact carrying members are provided with a plurality of holes extending therethrough parallel to the axis thereof and equally spaced about said axis, and a bolt extending successively through registering holes of said annular members to hold said annular members in a predetermined relation one to the other.

CHARLES WILLIAM BERTHIEZ.

REFERENCES CITED

The following references are of record in the file of this patent:

UNITED STATES PATENTS

| Number | Name | Date |
|---|---|---|
| 2,404,940 | Beal | July 30, 1946 |
| 2,438,970 | Glogau | Apr. 6, 1948 |